United States Patent
Kerling et al.

(10) Patent No.: US 12,270,760 B2
(45) Date of Patent: Apr. 8, 2025

(54) MASKING TO ELIMINATE DIRECT LINE OF SIGHT BETWEEN LIGHT EMITTER AND LIGHT RECEIVER IN A SMOKE DETECTOR

(71) Applicant: Carrier Corporation, Palm Beach Gardens, FL (US)

(72) Inventors: Jacob Kerling, Edina, MN (US); Slade Culp, Bradenton, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/240,859

(22) Filed: Aug. 31, 2023

(65) Prior Publication Data

US 2024/0068942 A1    Feb. 29, 2024

Related U.S. Application Data

(60) Provisional application No. 63/374,078, filed on Aug. 31, 2022.

(51) Int. Cl.
*G01N 21/53* (2006.01)
*G08B 17/107* (2006.01)
*G08B 17/113* (2006.01)

(52) U.S. Cl.
CPC ......... *G01N 21/53* (2013.01); *G08B 17/107* (2013.01); *G08B 17/113* (2013.01); *G01N 2201/066* (2013.01)

(58) Field of Classification Search
CPC .......... G01N 21/53; G01N 2201/066
See application file for complete search history.

(56) References Cited

U.S. PATENT DOCUMENTS

| 5,302,837 | A | 4/1994 | Sawa et al. | |
|---|---|---|---|---|
| 5,486,816 | A | 1/1996 | Ariga et al. | |
| 6,181,251 | B1 * | 1/2001 | Kelly | G08B 17/00 362/147 |
| 11,069,224 | B1 * | 7/2021 | Hsieh | G08B 29/183 |
| 11,257,799 | B2 * | 2/2022 | Ho | H01L 31/0203 |

(Continued)

FOREIGN PATENT DOCUMENTS

| EP | 3009999 A1 | 4/2016 |
|---|---|---|
| GB | 2404731 A | 2/2005 |

OTHER PUBLICATIONS

Extended European Search Report received for EP Application No. 23193019.9, mailed on Jan. 25, 2024, 9 Pages.

*Primary Examiner* — Jennifer D Bennett
*Assistant Examiner* — Erin R Garber
(74) *Attorney, Agent, or Firm* — CANTOR COLBURN LLP (57) ABSTRACT

A cap for a light emitter and/or light receiver of a smoke detector for eliminating a direct line of sight between the light emitter and the light receiver is disclosed. The cap comprises an enclosure of a predefined profile having a predetermined open area at a predetermined position on the enclosure, which is adapted to be removably fitted over one or more of the light emitter and/or the light receiver. The cap upon fitting over any of the light emitter and the light receiver, the cap blocks a direct line of sight between the light emitter and the light receiver and allows the light receiver to receive only the light being reflected by smoke and a predefined amount of clean air signal present within the smoke detector.

18 Claims, 9 Drawing Sheets

(56) References Cited

U.S. PATENT DOCUMENTS

| | | | |
|---|---|---|---|
| 2021/0054984 A1* | 2/2021 | Shin | F21V 5/007 |
| 2022/0244177 A1* | 8/2022 | Kurozuka | G01N 21/3554 |
| 2022/0399390 A1* | 12/2022 | Washio | H01L 27/14627 |
| 2023/0060584 A1* | 3/2023 | Tsai | G08B 29/18 |

* cited by examiner

402 — REMOVING A PREDETERMINED AREA OF THE ENCLOSURE ASSOCIATED WITH THE CAP FOR THE LIGHT EMITTER AND FITTING THE CAP OVER THE LIGHT EMITTER

404 — REMOVING A PREDETERMINED AREA OF THE ENCLOSURE ASSOCIATED WITH THE CAP FOR THE LIGHT RECEIVER AND FITTING THE CAP OVER THE LIGHT RECEIVER

*FIG. 4*

MASKING TO ELIMINATE DIRECT LINE OF SIGHT BETWEEN LIGHT EMITTER AND LIGHT RECEIVER IN A SMOKE DETECTOR

CROSS-REFERENCE TO RELATED APPLICATION

This patent application claims the benefit of priority of U.S. Provisional Patent Application No. 63/374,078, filed on Aug. 31, 2022.

TECHNICAL FIELD

This invention relates to the field of smoke detectors, and more particularly, to various methodologies for eliminating nuisance light from entering the light receiver; specifically, by eliminating the direct line of sight between the light emitter and light receiver.

BACKGROUND

A photoelectric smoke detector typically includes a chamber consisting of light emitter(s), such as Light Emitting Diodes (LEDs), and light receiver(s), such as a Photo Diodes (PDs). The smoke detector detects the presence and amount of smoke in the chamber when light (photons) emitted by the light emitter is scattered by the smoke particles and the scattered photons are sensed by the light receiver. The intensity of reflected photons being sensed by the light receiver is directly proportional to the amount and severity of smoke present inside the smoke detector's chamber. Moreover, it's also a strong indication of the amount and severity of smoke present at the location where the smoke detector is installed. Due to the very principal that optical smoke detectors operate under (the scattering of photons), it is an ultimate goal to have limited ambient light (from sources such as room lighting, sunlight, etc.) and nuisance light (directly from the light emitter(s), scattered from dust, reflected from inside the chamber, etc.) being sensed by the light receiver when no smoke is present. In other words, when the air is clean, the light receiver should be in mostly darkness, sensing limited photons. However, a small baseline amount of ambient and nuisance light is allowable to give proof that the system components are operating as intended. Since the photo receivers are very sensitive and it's preferable to keep the baseline amount of light detected low, direct light should be blocked between the light emitter (s) and light receiver(s). Not doing so may result in saturation in our light receiver(s). Additionally, alternative nuisance lighting (i.e., reflections and scattering from dust) that is harder to eliminate completely may be enough to reach a baseline reading.

Efforts have been made in the art to overcome the above-mentioned shortcomings and drawbacks associated with existing smoke detectors. Some existing chamber designs may block nuisance light. However, improvement may be needed in terms of physical space required to block direct line of sight, as well as reducing the relatively cumbersome manufacturing and calibration steps needed in existing designs.

SUMMARY

Described herein is a cap for eliminating a direct line of sight between a light emitter and a light receiver of a smoke detector. The cap comprises an enclosure of a predefined profile that is adapted to be removably fitted over one or more of the light emitter and the light receiver, wherein the cap upon fitting over any of the light emitter and the light receiver, blocks a direct line of sight between the light emitter and the light receiver and allows the light receiver to receive only the light being reflected by smoke and a predefined amount of clean air signal present within the smoke detector.

In one or more embodiments, a predetermined area of the enclosure associated with one or more of the light emitter and the light receiver is open, wherein the predetermined open area is configured to enable the light emitter to emit light in a predetermined direction towards a smoke region in a chamber of the smoke detector, and enables the light receiver to receive only the light being reflected by the smoke and the predefined amount of the clean air signal present in the chamber In one or more embodiments, the predetermined open area of the enclosure associated with the light emitter is removed from a predetermined position on the enclosure, wherein the predetermined open area and the predetermined position are selected based on a distance and line of sight between the light emitter and the smoke region.

In one or more embodiments, the predetermined open area of the enclosure associated with the light receiver is removed from a predetermined position on the enclosure, wherein the predetermined open area and the predetermined position are selected based on a distance and line of sight between the light receiver and the smoke region.

In one or more embodiments, the enclosure has a curved profile corresponding to a profile of a light diffuser or lens associated with the light emitter.

In one or more embodiments, the enclosure has a curved profile corresponding to a profile of a light collection lens associated with the light receiver.

In one or more embodiments, the enclosure comprises a strip of a predefined width that extends at least over a lens associated with one or more of the light emitter and the light receiver upon fitting the cap thereover, wherein the fitted strip blocks the direct line of sight between the light emitter and the light receiver.

In one or more embodiments, the enclosure is made of a flexible material that is adapted to take a profile of a lens associated with one or more of the light emitter and the light receiver upon fitting the cap thereover.

In one or more embodiments, the cap comprises a coupling element at a rear end of the enclosure, wherein the coupling element is configured to secure the cap over one or more of the light emitter and the light receiver.

In one or more embodiments, the cap is made of a smoke and heat resistive material.

In one or more embodiments, the cap is made of an infrared light absorbing material that restricts infrared light to pass through the enclosure.

Also described herein is a smoke detector comprising at least one light emitter, a light receiver. and a cap comprising an enclosure that is removably fitted over one or more of the at least one light emitter, and the light receiver, wherein the fitted cap blocks a direct line of sight between the at least one light emitter and the light receiver, and allows the light receiver to receive only the light being reflected by smoke present in the smoke detector In one or more embodiments, the smoke detector comprises a housing having a chamber that is adapted to receive the smoke from an area of interest (AOI) where the smoke detector is installed, and wherein the at least one light emitter and the light receiver are disposed in the housing such that a lens associated with the at least one light emitter and the light receiver is visible within the chamber.

In one or more embodiments, a predetermined area of the enclosure associated with the caps of the at least one light emitter is removed from or open at a predetermined position to focus light emitted by the at least one light emitter in a predetermined direction towards the smoke present within the chamber.

In one or more embodiments, a predetermined area of the enclosure associated with the cap of the light receiver is removed from or open at a predetermined position to allow the light receiver to receive or sense only the light being reflected by the smoke and a predefined amount of the clean air signal present within the chamber.

In one or more embodiments, the enclosure comprises a strip of a predefined width that extends at least over a lens associated with one or more of the light emitters and the light receiver upon fitting the cap thereover, and wherein the strip blocks the direct line of sight between the at least one light emitter and the light receiver.

Further described herein is a method of eliminating a direct line of sight between a light emitter and a light receiver of a smoke detector. The method comprising the steps of fitting a cap comprising an enclosure of a predefined profile over one or more of the light emitter and the light receiver, wherein the predefined profile is configured to enable: the light emitter to emit light in a predetermined direction towards smoke present within a chamber of the smoke detector; and the light receiver to receive only the light being reflected by the smoke and a predefined amount of clean air signal present in the chamber.

In one or more embodiments, the method comprises the step of removing a predetermined area of the enclosure associated with the cap for the light emitter and fitting the cap over the light emitter to enable focusing the emitted light in the predetermined direction toward the smoke present within the chamber.

In one or more embodiments, the method comprises the step of removing a predetermined area of the enclosure associated with the cap for the light receiver and fitting the cap over the light receiver to allow the light receiver to receive only the light being reflected by the smoke and the predefined amount of the clean air signal present in the chamber.

In one or more embodiments, the method comprises the step of placing the enclosure having a strip of a predefined width, at least partially over a lens associated with one or more of the light emitter and the light receiver, wherein the strip blocks the direct line of sight between the light emitter and the light receiver.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention described herein may be positioned in any desired orientation. Thus, the use of terms such as "above," "below,"

"upper," "lower," "first", "second" or other like terms to describe a spatial relationship between various components or to describe the spatial orientation of aspects of such components should be understood to describe a relative relationship between the components or a spatial orientation of aspects of such components, respectively, as the light emitter, light receiver, cap, smoke detector, smoke region, and corresponding components, described herein may be oriented in any desired direction.

Figure 1A:
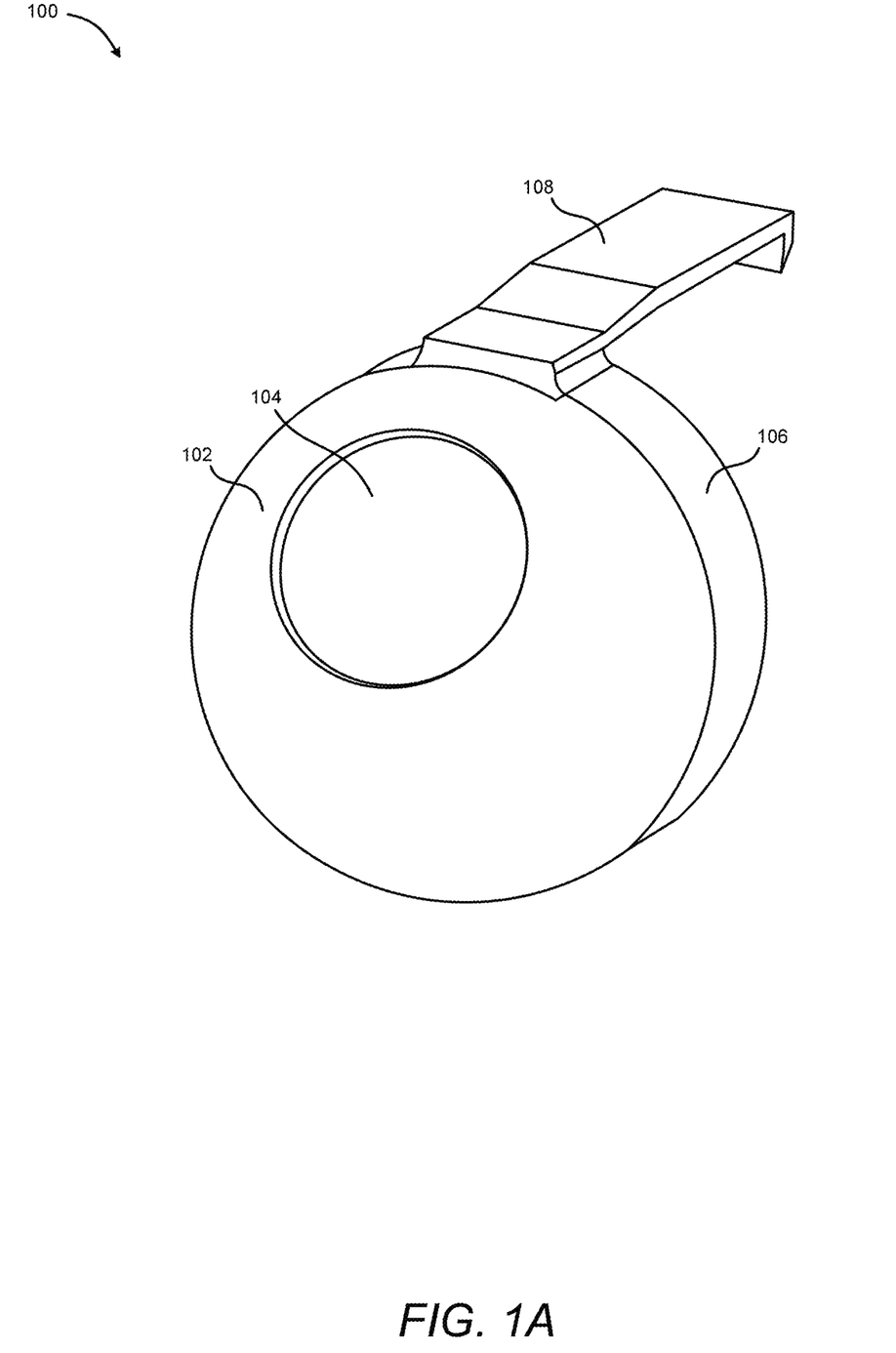
FIG. 1A is a schematic diagram illustrating an exemplary embodiment of the cap in accordance with one or more embodiments of the disclosure.
Figure 1B:
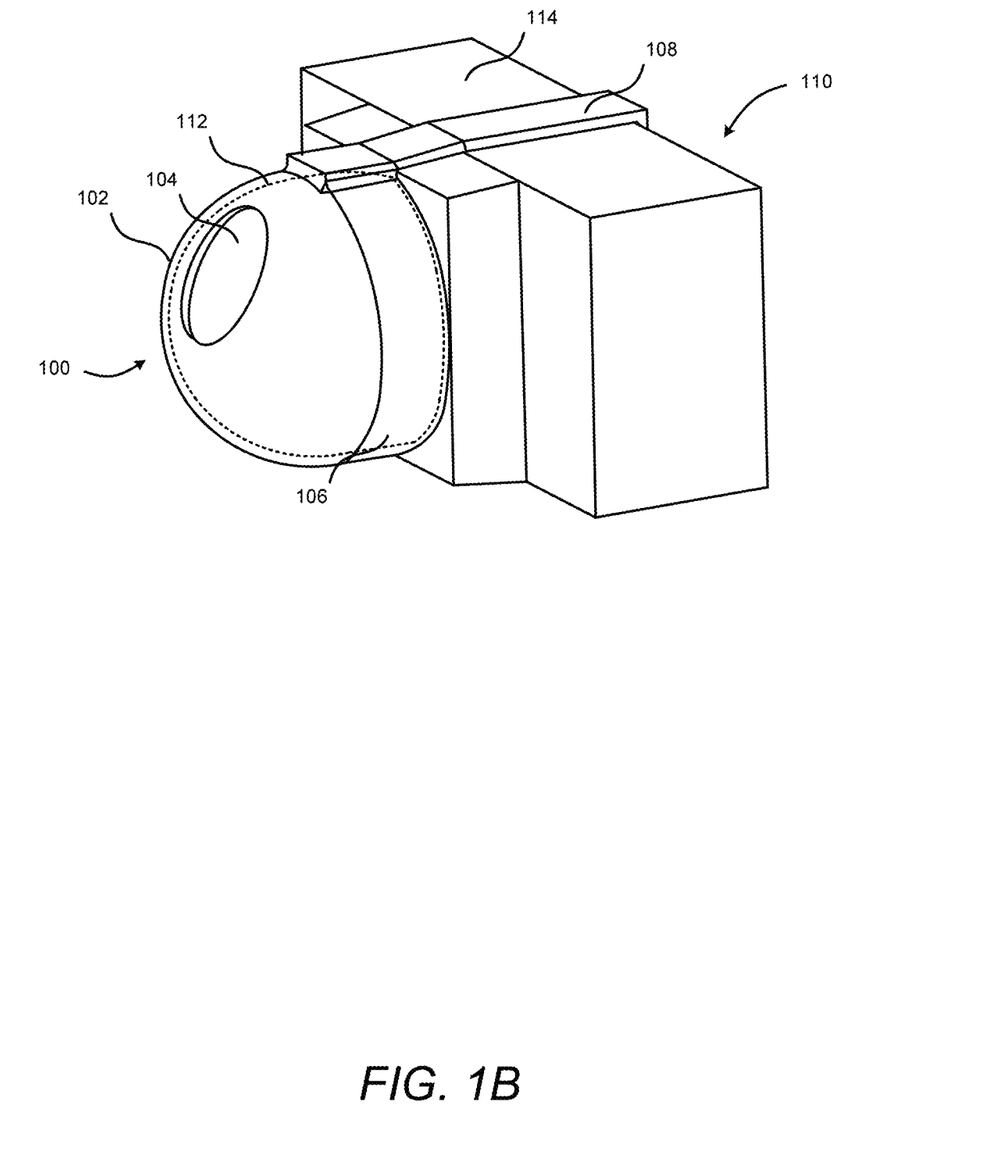
FIG. 1B is a schematic diagram illustrating the cap of FIG. 1A fitted over a surface mounted light emitter or light receiver of a smoke detector in accordance with one or more embodiments of the disclosure.
Figure 1C:
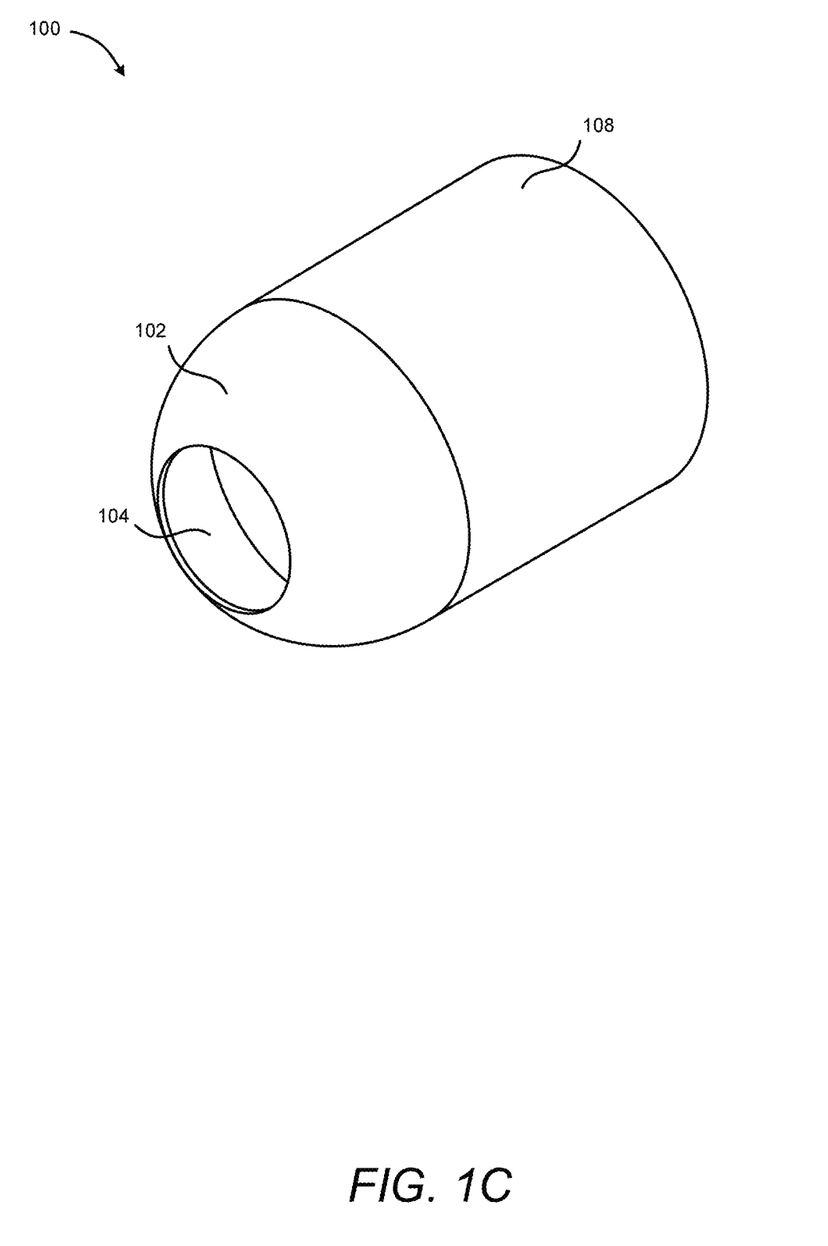
FIG. 1C is a schematic diagram illustrating another exemplary embodiment of the cap in accordance with one or more embodiments of the disclosure.
Figure 1D:
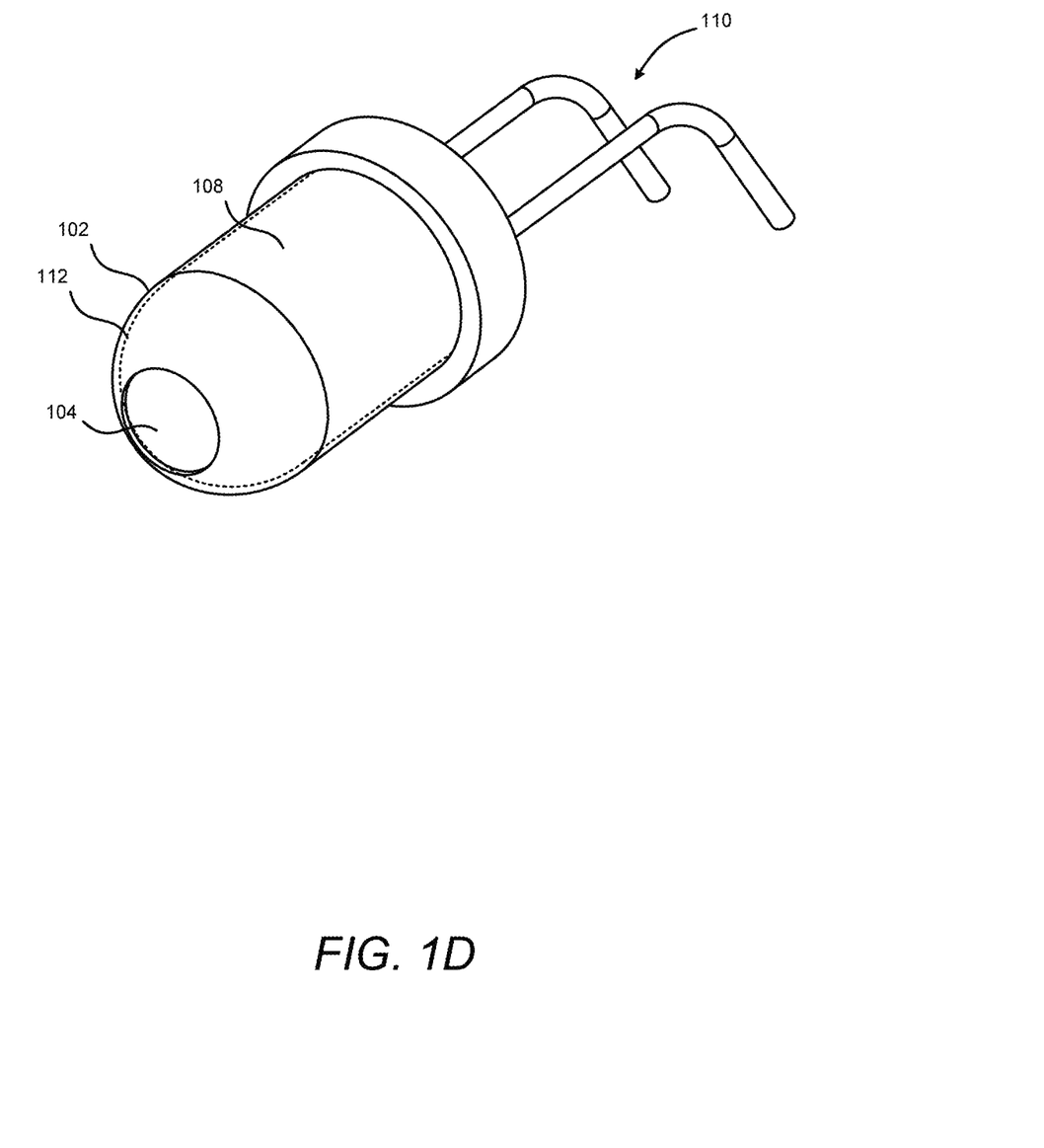
FIG. 1D is a schematic diagram illustrating the cap of FIG. 1C fitted over a through-hole component used in a smoke detector in accordance with one or more embodiments of the disclosure.

Referring to FIGS. 1A to 1D, exemplary embodiments of the cap 100 for a light emitter and/or a light receiver (collectively designated as 110 in FIG. 1B, herein) of a smoke detector are illustrated, in accordance with one or more embodiments of the disclosure. Cap 100 may be configured to eliminate nuisance light from entering the light receiver; specifically, by eliminating the direct line of sight between the light emitter and light receiver. In some embodiments, by decreasing the amount of material required to block direct line of sight, we can rather leave that physical space open to increase smoke entry. If the amount of material used, manufacturing steps, and calibration steps are all decreased, we could see an overall decrease in cost associated with the smoke detector's chamber. Embodiments of the present disclosure may provide an improved, cost-effective, and efficient solution that is easily configurable with the light emitter(s) and light receiver(s), eliminates a direct line of sight between the light emitter(s) and light receiver(s), and increases smoke's ability to enter the detection chamber. FIG. 1B illustrates an exemplary embodiment of the cap being fitted over a surface-mounted light receiver or light emitter used in the smoke detector. FIG. 1D illustrates another exemplary embodiment of the cap being fitted over a through-hole component light receiver or light emitter used in the smoke detector. It should be obvious for an ordinary person that the light emitter and light receiver are collectively designated as 110 for the sake of simplicity and easier explanation of the invention, however, one or two different caps 100 may be separately fitted over the light emitter and/or a light receiver in this invention. The cap 100 includes an enclosure 102 having a predefined profile concurrent to the profile of a light emitting portion or a light receiving portion (collectively designated as 112, herein) of the light emitter or the light receiver, respectively. The cap 100 can be fitted over any or both the light emitter and the light receiver to block the line of sight between the light emitter and the light receiver in a chamber of the smoke detector. The light emitting or light receiving portion 112 is generally the front end of the body 114 of the light emitter and the light receiver, which may have a curved profile, cylindrical profile, or oval profile, but is not limited to the like.

In an embodiment, as shown in FIGS. 1A and 1B, the enclosure 102 of the cap 100 to be fitted over a surface-mounted light emitter 110 can have a profile concurrent to the profile of a light diffuser or a lens (light emitting portion) 112 of the light emitter 110. This lens or light diffuser 112 generally has a curved profile, which extends out from the front end of the body 114 of the light emitter 110. Further, the electrical and electronic components of the light emitter 110 for generating the light remain enclosed within the body 114 of the light emitter 110. In another instance, the enclosure 102 of the cap 100 to be fitted over a surface-mounted light receiver 110 can have a profile concurrent to the profile of a light collecting lens (light collecting portion) 112 of the light receiver 110. This light collecting lens 112 generally has a curved profile, which extends out from the front end of the body 114 of the light receiver 110. Further, the electrical and electronics components and photon sensing elements of the light receiver 110 for detecting the photon count in the incoming light remain enclosed within the body 114 of the light receiver 110.

In another embodiment, as shown in FIGS. 1C and 1D, the enclosure 102 of the cap 100 to be fitted over a through-hole component light emitter 110 can have a profile concurrent to the profile of a light diffuser or a lens (light emitting portion) 112 of the light emitter 110. This lens or light diffuser 112 generally has a front curved portion that extends out from a cylindrical portion. The connectors of the light emitter 110 extend from the rear end of the cylindrical portion of the light emitter 112. Further, the enclosure 102 of the cap 100 to be fitted over a through-hole component light receiver 110 can have a profile concurrent to the profile of a light collecting lens (light collecting portion) 112 of the light receiver 110. This light collecting lens 112 generally has a curved portion that extends out from a cylindrical portion of the light receiver 110. Further, the connectors of the light receiver 112 extend from rear end of the cylindrical portion.

In some embodiments, the enclosure 102 of the cap 100 has a curved profile based on the generally curved profile of the light emitting portion or light receiving portion 112 extending from the front end of the body 114 of the light emitter or the light receiver, respectively. However, the enclosure 102 of the cap 100 can also have other profiles such as a conical profile, cylindrical profile, oval profile, and the like, depending on the profile of the light emitting portion or light receiving portion 112 of the light emitter or the light receiver, respectively, such that enclosure 102 fits properly over the light emitting or light receiving portion 112 with minimal diffraction of light, and all such embodiments are well within the scope of this invention. Further, a predetermined area 104 of the enclosure 102, which may preferentially be a circular area 104 of a predetermined diameter, is removed or kept open at a predetermined position on the enclosure 102, and the remaining area of the enclosure 102 remains opaque or covered, such that upon fitting this enclosure 102/cap 100 over the light emitter and/or light receiver, the light emitter emits light (photons) in a predetermined direction towards a smoke region in the chamber of the smoke detector through the open area 104 of the light emitter cap 100 only and the light receiver receives only the light being reflected by the smoke and a predefined amount of clean air signal present in the chamber through the open area 104 of the light receiver cap 100 only. This predefined (minimal) level of clean air signal is required in all smoke detectors to verify the functionality of the detector optics at any given time.

Figure 3A:
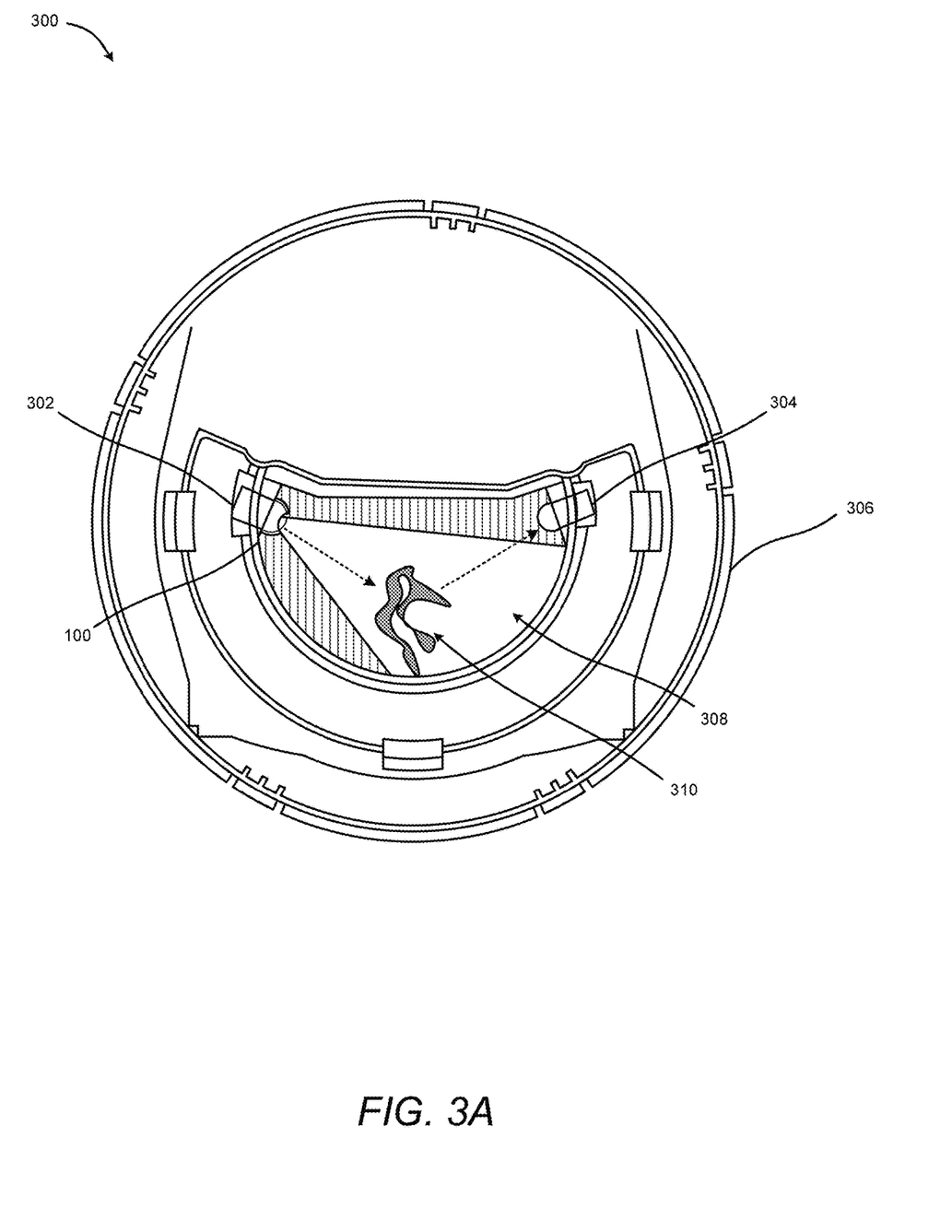
FIG. 3A is a schematic diagram illustrating an exemplary embodiment of a smoke detector, where the cap of FIG. 1A or 1C is fitted over the light emitter in accordance with one or more embodiments of the disclosure.

Referring to FIGS. 1A and 3A, the predetermined open area 104 of the enclosure 102 associated with the cap 100 (of FIG. 1A) for the surface-mounted light emitter 302 and the predetermined position of the open area 104 on the enclosure 102 of cap 100 is selected based on the distance and line of sight between the light emitter 302 and the smoke region 310 of the smoke detector 300, such that the photons generated by the electrical and electronic components of the light emitter 302 are completely focused through the open area 104 of the cap 100, in a predetermined direction towards the smoke 310 present within the chamber 308 as shown in FIG. 3A. The remaining closed or opaque area 104 of the cap 100 of the light emitter 302 restricts generated photons to move or being directed towards the light receiver 304 or towards the inner wall of the chamber 308 of the smoke detector 300. Similarly, (not shown) the predetermined open area 104 of the enclosure 102 associated with the cap 100 of the light receiver 304 and the predetermined position of the open area 104 on the enclosure 102 of cap 100 is selected based on the distance and line of sight between the light receiver 304 and the smoke region 310 of the smoke detector 300, such that all the photons reflected by the smoke 310 and the minimal amount of the clean air signal within the chamber 308, enter the light receiver 304 through the open area 104 of the cap 100 only. The received photons are further sensed and counted by the electrical and electronic components of the light receiver. The remaining closed or opaque area of the cap 100 of the light receiver restricts photons from other zones of the chamber 308 such as the photons directly coming from the light emitter 302 without reflecting from the smoke 310 and the photons being reflected by the inner wall of the chamber 308, to enter the light receiver 304.

Referring back to FIGS. 1A and 1B, the cap 100 further includes a coupling element at the rear end of the enclosure 102 of the cap 100 to secure the cap 100 over the light emitter or the light receiver. As illustrated in FIG. 1A, the coupling element extends from the rim at the rear end of the enclosure 102 of the cap 100. This coupling element is adapted to engage with the body 114 of the light emitter or the light receiver, which secures the enclosure 102/cap 100 over the light emitting or light collecting portion of the light emitter or the light receiver as shown in FIG. 1B. In some embodiments, the coupling element includes an annular portion 106 extending from the rim of the enclosure 102 and an engaging portion 108 extending from the circumference of the annular portion 106. The engaging portion 108 is adapted to engage and lock with the body 114 of the light emitter or the light receiver, or any other interior fixtures within the chamber of the smoke detector. In other embodiments, the annular portion 106 of the coupling element is removably attached to the rim of the enclosure 102, however, the coupling element may also be an integral part of the enclosure 102.

Accordingly, the cap 100 fitted over the light emitter 302 focuses all the photons emitted by the light emitter 302 towards the smoke 310 in the chamber 308, and later on, the cap when fitted on the light receiver 304 allows the light receiver 304 to receive only the photons being reflected by the smoke 310 and the minimal amount of the clean air signal present in the chamber 308 and restricts any other photons to enter the light receiver 304, thereby making the smoke detector 300 accurate and reliable. Besides, as the cap 100 of this invention is compact and easily configurable over the light emitter or light receiver of a smoke detector, as a result, the open space within the chamber of the smoke detector increases, thereby improving the smoke entry within the smoke detector. Further, the cap 100 of this invention does not consume any additional space nor require any additional machining to be retrofitted in the existing smoke detectors, which further helps keep the smoke detector simple, compact, and affordable. Moreover, as the cap 100 allows only the required photons to be emitted from the open area 104 of the light emitter cap 100, the electrical power required by the light emitter 302 can be kept lower compared to a light emitter without the cap, as a result, the electrical power requirement of the smoke detector 300 can also be reduced, thereby making the overall smoke detector 300 power efficient.

Figure 2A:
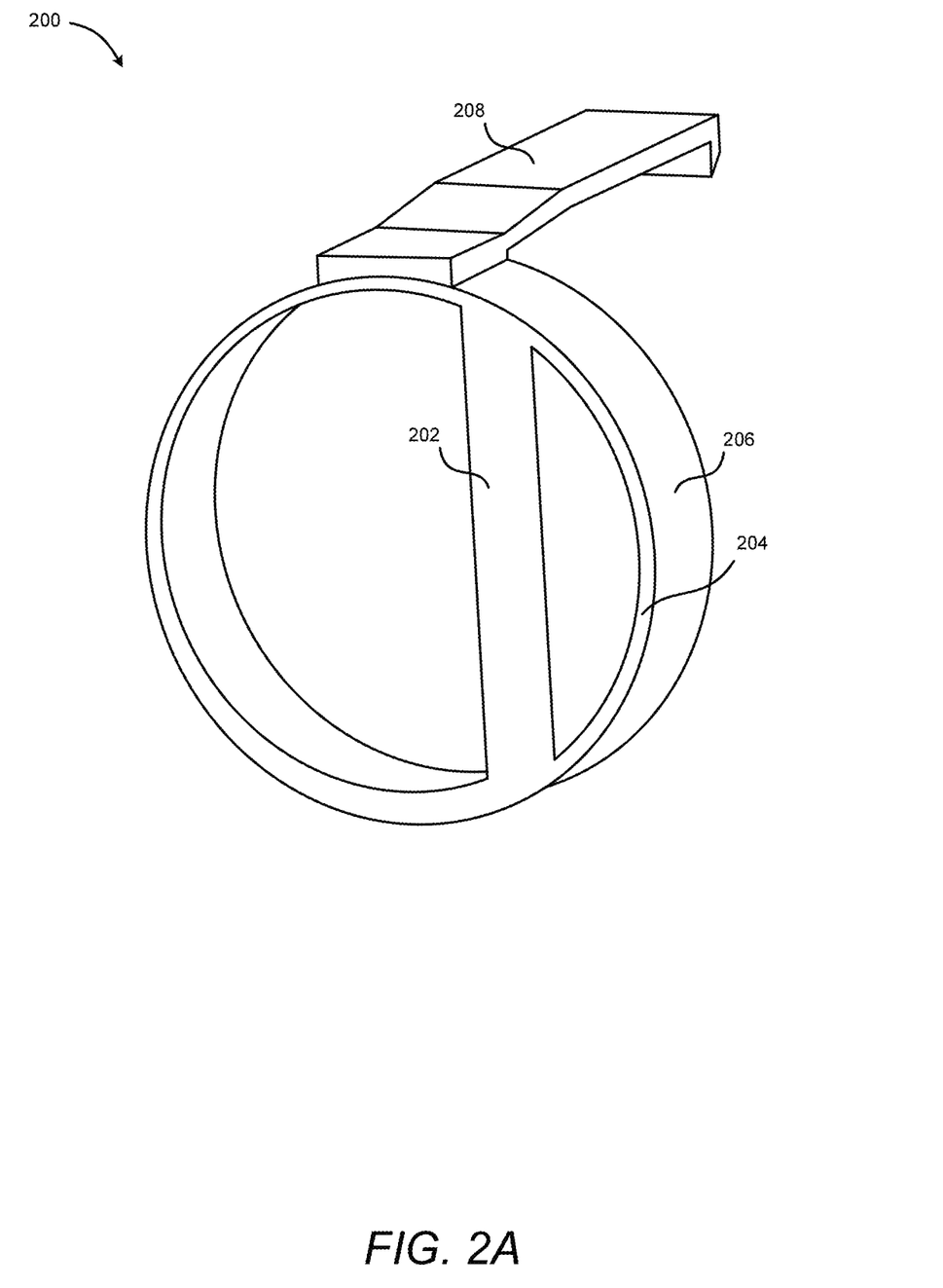
FIG. 2A is a schematic diagram illustrating another exemplary embodiment of the cap (strip cap) in accordance with one or more embodiments of the disclosure.
Figure 2B:
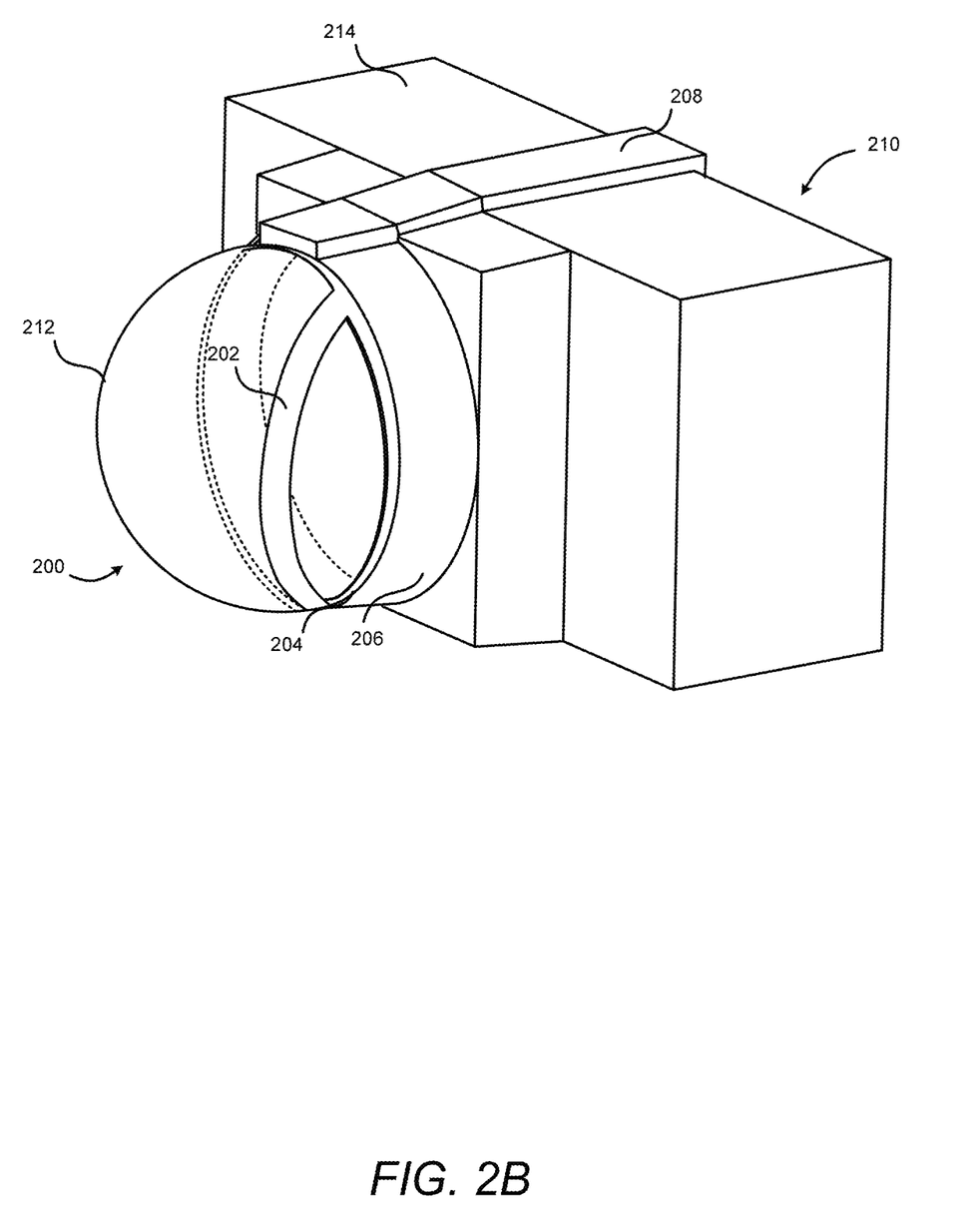
FIG. 2B is a schematic diagram illustrating the cap of FIG. 2A fitted over the light emitter or light receiver of a smoke detector in accordance with one or more embodiments of the disclosure.

Referring to FIGS. 2A and 2B, another exemplary embodiment of the cap 200 (also referred to as strip cap 200, herein) of this invention for the light emitter and/or the light receiver of a smoke detector are illustrated. The strip cap 200 includes an enclosure 204 having a strip 202 of a predefined width. The width and orientation of the strip 202 of the strip cap 200 are selected such that upon fitting the strip cap 200 over the light emitter or the light receiver (collectively designated as 210, herein for the sake of simplicity), the strip 202 extends at least partially in front of the light emitting or light receiving portion 212 associated with the light emitter or the light receiver, respectively. The strip cap 200 can be fitted over any or both the light emitter and the light receiver to block the line of sight between the light emitter and the light receiver in a chamber of the smoke detector. The fitted strip cap 200 (or strip 202) blocks the direct line of sight between the light emitter and the light receiver, similar to placing a finger directly in front of an eye to block a large object that's far away from the finger.

The strip cap 200 also includes a coupling element as used at the rear end of the strip cap of FIG. 2A. The coupling element is connected to the two ends of the strip 202 of the strip cap 200. This coupling element is adapted to fit over a rim or base of the light emitting or light receiving portion 212 of the light emitter or the light receiver such that the strip 202 extends horizontally or vertically along a diameter or a chord over the front circular surface of the light emitting or light receiving portion 212 of the light emitter or the light receiver as shown in FIG. 2B. The coupling element is further secured to the body 214 of the light emitter or the light receiver. In some embodiments, the coupling element includes an annular portion 206 connected to the enclosure 204, which fits over a rim or base of the light emitting or light receiving portion 212 of the light emitter or the light receiver. Further, the ends of the strip 202 are connected at two different points on the circumference of the annular portion 206 such that the strip 202 extends horizontally or vertically along a diameter or a chord in front of the circular surface of the light emitting or light receiving portion 212 upon fitting the strip cap 200 over the light emitter or the light receiver. The coupling element further includes an engaging portion 208 extending from the circumference of the annular portion 206. The engaging portion 208 is adapted to engage and lock with the body 214 of the light emitter or the light receiver, or any other interior fixtures within the chamber of the smoke detector. In other embodiments, the strip 202 is removably coupled to the annular portion 206 of the coupling element, however, the coupling element 206 may also be an integral part of the enclosure 204 or strip 202.

In some embodiments, the cap 100 of FIGS. 1A, 1C, and the strip cap 200 of FIG. 2A are made of a flexible material that is adapted to take a profile of the light emitting or light receiving portion of the light emitter or the light receiver upon fitting the cap thereover. The cap 100 and strip cap 200 can preferentially be made of smoke and heat-sensitive material. Further, the cap 100 and strip cap 200 can also be made of an infrared (IR) light absorbing material that restricts IR light to pass through the enclosure 102 of the cap 100 or through strip 202 of cap 200. This restricts the IR light being generated by the light emitter to pass through the solid area (non-open area) of the cap 100 and the strip cap 200 and also restricts the IR light to enter the light receiver through the solid area.

Referring to FIG. 3A, a smoke detector 300 fitted with the cap 100 is illustrated. Further, referring to FIG. 3B, a smoke detector 300 fitted with the strip cap 200 is illustrated. The smoke detector 300 includes one or more light emitters 302, and a light receiver 304 disposed of at predefined positions on the inner wall within a chamber 308 of a housing 306 defining the shape of the smoke detector 300. For instance, in one embodiment, the light emitter 302 and the light receiver 304 may be positioned at opposite ends of an interior wall within the chamber 308 of the smoke detector 300 such that the longitudinal axis of the light emitter 302 and the light receiver 304 are in line. In another instance, the light emitter 302 may be positioned at a right angle from the light receiver 304 on the interior wall of the chamber 308, such that a longitudinal axis of the light emitter 302 is inclined at 90 degrees angle from a longitudinal axis of the light receiver 304. In yet another instance, the light emitter 302 may be positioned at an acute angle or obtuse angle from the light receiver 304 on the interior wall of the chamber 308, such that a longitudinal axis of the light emitter 302 makes the predefined acute angle or obtuse angle (for example at 60, 120 degrees angle, and the like) from a longitudinal axis of the light receiver 304.

The housing 306 of the smoke detector 300 includes apertures (not shown) that allow smoke 310 to enter the chamber 308 from a location or area of interest (AOI) where the smoke detector 300 is installed. The AOI may be a room, staircase, storage space, vehicle, hall, and the like. In some embodiments, the chamber 308 is molded from a light absorbing material to restrict the reflection of light from the walls of the chamber 308 toward the light emitter 302 or smoke region 310. In other embodiments, the inner walls of the chamber 308 are coated with anti-reflective material to restrict the reflection of light from the walls of the chamber 308 toward the light emitter 302 or smoke region 310. The smoke detector 300 further includes the cap 100 of FIG. 1A, or 1C, or strip cap 200 FIG. 2A that are already explained in detail in the subject matter pertaining to FIGS. 1A to 2B, fitted over any or both the light emitter 302 and the light receiver 304 to block the line of sight between the light emitter 302 and the light receiver 304 in the chamber 308 of the smoke detector 300.

Each of the light emitter 302 includes a body enclosing a light source such as LED, but not limited to the like, and other electrical and electronic components associated with a light emitter circuit already known in the art for enabling the light source to generate the light/photons. Further, a front end (light emitting portion) of the body of the light emitter 302 includes a lens or a light diffuser which may have a curved profile, and conical profile, but is not limited to the like. The light diffuser or lens evenly spreads the light output of the light source while eliminating hot spots.

The light receiver 304 includes a body enclosing photo-sensors and other electrical and electronic components associated with a light receiver circuit already known in the art for enabling the photosensors such as photoelectric cells or photodiodes that detects incoming photons and correspondingly generate a signal indicating the count of the photons reflected by the smoke present in the chamber 308. Further, a front end (light receiving portion) of the body of the light receiver 304 includes a light collection or converging lens, which may have a curved profile, and conical profile, but not limited to the like, which helps converge the incoming photons towards the photosensors within the body of the light receiver 304.

In some embodiments, the enclosure of the cap 100 has a curved profile based on the generally curved profile of the light emitting or light receiving portion extending from the front end of the body of the light emitter 302 or the light receiver 304, respectively. However, the enclosure of the cap 100 can also have other profiles such as a conical profile, cylindrical profile, oval profile, and the like, depending on the profile of the light emitting or light receiving portion of the light emitter 302 or the light receiver 304, respectively, such that enclosure fits properly over the light emitting or light receiving portion with minimal diffraction.

Further, a predetermined area of the enclosure of the cap 100, which may preferentially be a circular area of a predetermined diameter, is removed or kept open at a predetermined position on the enclosure and the remaining area of the enclosure remains opaque or covered, such that upon fitting this enclosure/cap 100 over the light emitter 302 and/or light receiver 304, the light emitter 302 emits light (photon) in a predetermined direction towards a smoke region 310 in the chamber 308 of the smoke detector 300 through the open area of the light emitter cap 100 only and the light receiver 304 receives only the light being reflected by the smoke and the minimal amount of the clean air signal present in the chamber 308 through the open area of the light receiver cap 100 only.

The predetermined open area of the enclosure associated with the cap 100 of the light emitter 302 and the predetermined position of the open area on the enclosure is selected based on the distance and line of sight between the light emitter 302 and the smoke region 310 of the smoke detector 300, such that the photons generated by the electrical and electronic components of the light emitter 302 is completely focused through the open area of the light emitter cap 100, in a predetermined direction towards the smoke 310 present within the chamber 308. For instance, when the light emitter 302 is at an elevated position from the smoke region 310 within the chamber 308 of the smoke detector 300, the open area can be provided at the bottom half of the enclosure so that the emitted photons can be directed towards the smoke or smoke region 310 only. In another instance, when the smoke region 310 is at an elevated position from the light emitter 302 within the chamber 308 of the smoke detector 300, the open area can be provided at the upper half of the enclosure so that the emitted photons can be directed towards the smoke or smoke region 310 only. Further, the remaining closed or opaque area of the cap 100 of the light emitter 302 may be made of or coated with a light blocking material that restricts generated photons to be directed towards the light emitter 302 or towards the inner wall of the chamber 308 of the smoke detector 300.

Similarly, the predetermined open area of the enclosure associated with the cap 100 of the light receiver 304 and the predetermined position of the open area on the enclosure is selected based on the distance and line of sight between the light receiver 304 and the smoke region 310 of the smoke detector 300, such that all the photons reflected by the smoke 310 at the smoke region 310 and the minimal amount of the clean air signal within the chamber 308 enter the light receiver 304 through the open area of the cap 100 only. The received photons are further sensed and counted by the photosensors of the light receiver 304. For instance, when the light receiver 304 is at an elevated position from the smoke region 310 within the chamber 308 of the smoke detector 300, the open area can be provided at the bottom half of the enclosure so that the light receiver 304 can receive only the photons being reflected by the smoke 310 and the minimal amount of clean air. In another instance, when the smoke region 310 is at an elevated position from the light receiver 304 within the chamber 308 of the smoke detector 300, the open area can be provided at the upper half of the enclosure so that the light receiver 304 can receive only the photons being reflected by the smoke 310 and the minimal amount of clean air. The remaining closed or opaque area of the cap 100 of the light receiver 304 restricts photons from other zones of the chamber 308 such as the photons directly coming from the light emitter 302 without reflecting from the smoke 310 and the photons being reflected by the inner wall of the chamber 308, to enter the light receiver 304.

Figure 3B:
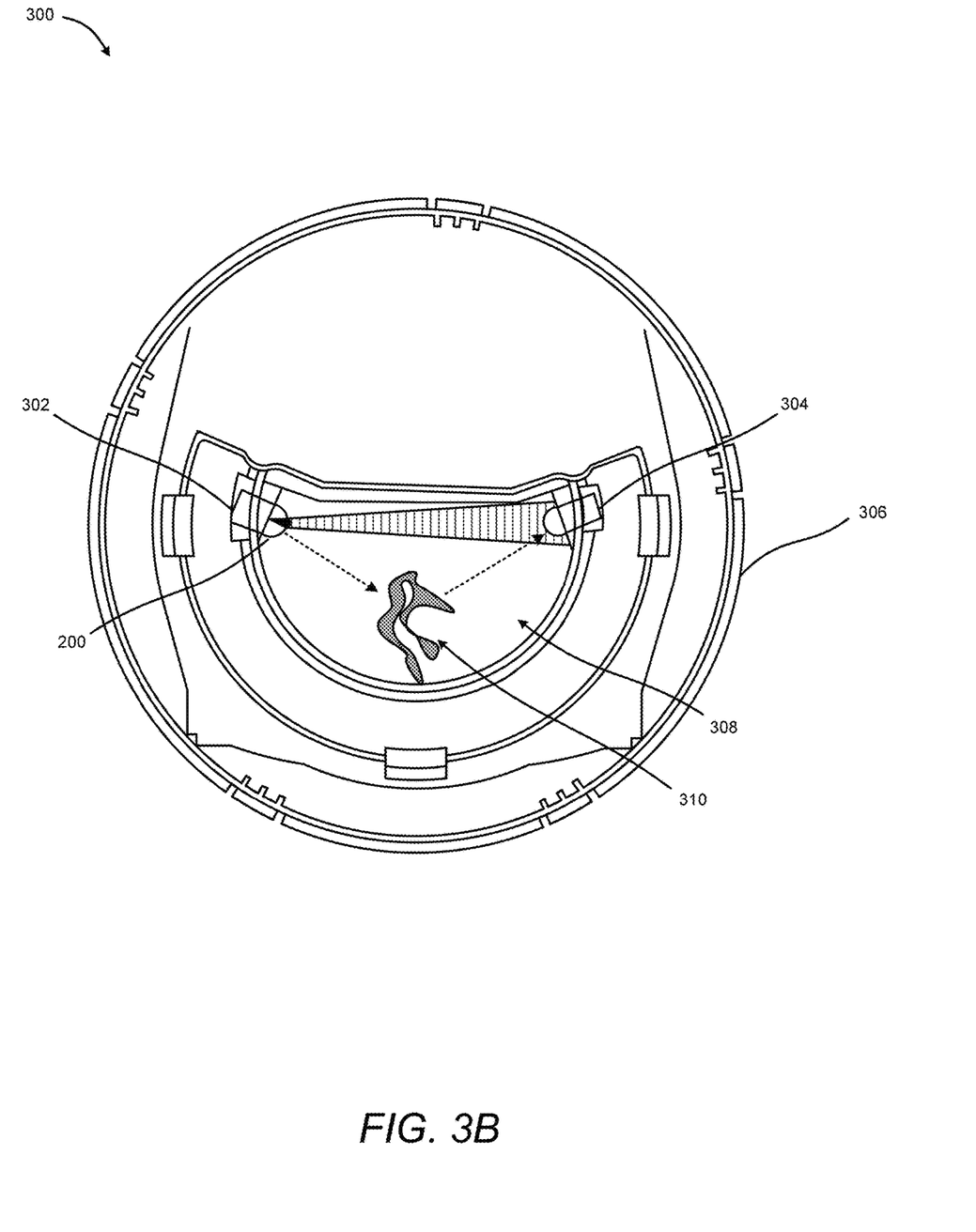
FIG. 3B is a schematic diagram illustrating an exemplary embodiment of a smoke detector, where the strip cap of FIG. 2A is fitted over the light emitter in accordance with one or more embodiments of the disclosure.

In other embodiments, as shown in FIG. 3B, the smoke detector 300 includes a strip cap 200 of FIG. 2A, which has an enclosure that is in form of a strip having a predefined width. The width and orientation of the strip of the strip cap 200 are selected such that upon fitting the strip cap 200 over the light emitter 302 and/or the light receiver 304 of the smoke detector 300, the strip extends at least partially in front of the light emitting or light receiving portion associated with the light emitter 302 or the light receiver 304, respectively. The strip cap 200 can be fitted over any or both the light emitter 302 and the light receiver 304 to block the line of sight between the light emitter 302 and the light receiver 304 in a chamber 308 of the smoke detector 300. The fitted strip cap 200 (strip) blocks the direct line of sight between the light emitter 302 and the light receiver 304, similar to placing a finger directly in front of an eye to block sight from a large object that's far away from the finger.

In an embodiment, the smoke detector 300 includes a controller (not shown) operatively connected to the light emitter 302 and the light receiver 304. The controller provides a constant current or pulses of current to the light emitter 302, which enables the light emitter 302 to emit photons towards the smoke region 310 of the chamber 308. However, it is preferred to provide pulses of current to the light emitter 302 to make the smoke detector power efficient. Further, the controller processes the signal generated by the photosensors of the light receiver 304 upon receiving/sensing the photons reflected by the smoke, and correspondingly determines the amount of smoke present in the smoke detector 300 or the AOI. The controller further generates an alarm signal when the amount of detected smoke exceeds a threshold value.

It should be understood that, although the various embodiments and drawings of this invention have been elaborated for the light emitter and the light receiver having a curved front end, and correspondingly the enclosure of the cap also having a curved profile, however, a variety of profiles of the front end of the light emitter and the light receiver and a variety of profiles for the enclosure may be used, and all such embodiments are well within the scope of the invention.

Figure 4:
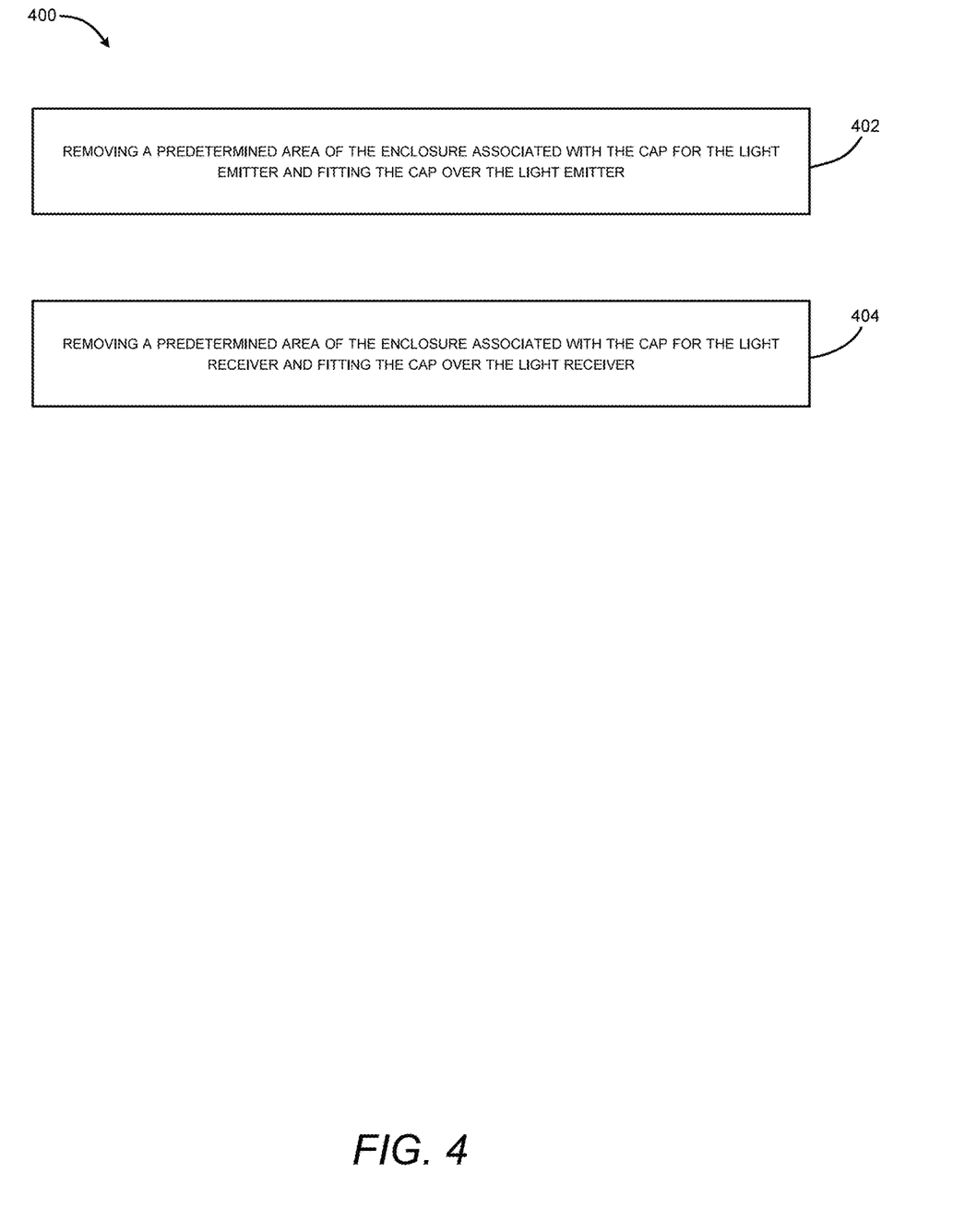
FIG. 4 is a flow diagram illustrating an exemplary embodiment of a method for eliminating a direct line of sight between a light emitter and a light receiver of a smoke detector in accordance with one or more embodiments of the disclosure.

Referring to FIG. 4, exemplary steps involved in a method 400 for eliminating a direct line of sight between a light emitter and a light receiver of a smoke detector. In an embodiment, method 400 incudes step 402 of removing a predetermined area of an enclosure associated with a cap for the light emitter and fitting the cap over the light emitter, which enables focusing the emitted light in the predetermined direction toward the smoke present within the chamber. Method 400 further includes step 404 of removing a predetermined area of the enclosure associated with the cap for the light receiver and fitting the cap over the light receiver, which allows the light receiver to receive only the light being reflected by the smoke and the minimal amount of clean air signal present in the chamber.

In another embodiment (not illustrated), method 400 includes the step of placing a cap (strip cap) having an enclosure including a strip of a predefined width, that extends at least partially in front of a lens associated with one or more of the light emitters and the light receiver, such that the strip blocks the direct line of sight between the light emitter and the light receiver. The width and orientation of the strip of the strip cap are selected such that upon fitting the strip cap over the light emitter or the light receiver, the strip extends either horizontally or vertically in front of the light emitting or light receiving portion of the light emitter or the light receiver, respectively. The strip cap can be fitted over any or both the light emitter and the light receiver to block the line of sight between the light emitter and the light receiver in a chamber of the smoke detector. The fitted strip cap (strip) blocks the direct line of sight between the light emitter and the light receiver.

While the invention has been described with reference to exemplary embodiments, it will be understood by those skilled in the art that various changes may be made, and equivalents may be substituted for elements thereof without departing from the scope of the invention as defined by the appended claims. Modifications may be made to adopt a particular situation or material to the teachings of the invention without departing from the scope thereof. Therefore, it is intended that the invention is not limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A cap for eliminating a direct line of sight between a light emitter and a light receiver of a smoke detector, the cap comprising:
    an enclosure of a predefined profile that is adapted to be removably fitted over one or more of the light emitter and the light receiver;
wherein the cap upon fitting over any of the light emitter and the light receiver, blocks the direct line of sight between the light emitter and the light receiver and allows the light receiver to receive only the light being reflected by smoke and a predefined amount of clean air signal present within the smoke detector, wherein
a predetermined area of the enclosure is open, the predetermined open area is configured to enable;
    the light emitter to emit light in a predetermined direction towards a smoke region in a chamber of the smoke detector; and
    the light receiver to receive only the light being reflected by the smoke and the predefined amount of the clean air signal present in the chamber, and wherein
    the predetermined open area of the enclosure is removed from a predetermined position on the enclosure, wherein the predetermined open area and the predetermined position are selected based on a distance and line of sight between the light emitter and the smoke region.

2. The cap of claim 1, wherein the predetermined open area of the enclosure associated with the light receiver is removed from a predetermined position on the enclosure, wherein the predetermined open area and the predetermined position are selected based on a distance and line of sight between the light receiver and the smoke region.

3. The cap of claim 1, wherein the enclosure has a curved profile corresponding to a profile of a light diffuser or lens associated with the light emitter.

4. The cap of claim 1, wherein the enclosure has a curved profile corresponding to a profile of a light collection lens associated with the light receiver.

5. The cap of claim 1, wherein the enclosure comprises a strip of a predefined width that extends at least over a lens associated with one or more of the light emitter and the light receiver upon fitting the cap thereover, wherein the fitted strip blocks the direct line of sight between the light emitter and the light receiver.

6. The cap of claim 1, wherein the enclosure is made of a flexible material that is adapted to take a profile of a lens associated with one or more of the light emitter and the light receiver upon fitting the cap thereover.

7. The cap of claim 1, wherein the cap comprises a coupling element at a rear end of the enclosure, wherein the coupling element is configured to secure the cap over one or more of the light emitters and the light receiver.

8. The cap of claim 1, wherein the cap is made of a smoke and heat resistive material.

9. The cap of claim 1, wherein the cap is made of an infrared light absorbing material that restricts infrared light to pass through the enclosure.

10. A smoke detector comprising:
at least one light emitter,
a light receiver; and
a cap comprising an enclosure that is removably fitted over one or more of the at least one light emitter, and the light receiver,
wherein the fitted cap blocks a direct line of sight between the at least one light emitter and the light receiver, and allows the light receiver to receive only light being reflected by smoke present in the smoke detector, wherein
a predetermined area of the enclosure is open, the predetermined open area is configured to enable;
the light emitter to emit light in a predetermined direction towards a smoke region in a chamber of the smoke detector; and
the light receiver to receive only the light being reflected by the smoke and a predefined amount of clean air signal present in the chamber, and wherein
the predetermined open area of the enclosure is removed from a predetermined position on the enclosure, wherein the predetermined open area and the predetermined position are selected based on a distance and line of sight between the light emitter and the smoke region.

11. The smoke detector of claim 10, wherein the smoke detector comprises a housing having a chamber that is adapted to receive the smoke from an area of interest (AOI) where the smoke detector is installed, and wherein the at least one light emitter and the light receiver are disposed in the housing such that a lens associated with the at least one light emitter and the light receiver is visible within the chamber.

12. The smoke detector of claim 10, wherein the predetermined area of the enclosure is configured to focus light emitted by the at least one light emitter in a predetermined direction towards the smoke present within the chamber.

13. The smoke detector of claim 10, wherein the predetermined area of the enclosure is configured to allow the light receiver to receive or sense only the light being reflected by the smoke and a predefined amount of the clean air signal present within the chamber.

14. A smoke detector comprising: at least one light emitter, a light receiver; and a cap comprising an enclosure that is removably fitted over one or more of the at least one light emitter, and the light receiver, wherein the fitted cap blocks a direct line of sight between the at least one light emitter and the light receiver, and allows the light receiver to receive only the light being reflected by smoke present in the smoke detector, wherein the enclosure comprises a strip of a predefined width that extends at least over a lens associated with one or more of the at least one light emitter and the light receiver upon fitting the cap thereover, and wherein the strip blocks the direct line of sight between the at least one light emitter and the light receiver.

15. A method of eliminating a direct line of sight between a light emitter and a light receiver of a smoke detector, the method comprising:

fitting a cap comprising an enclosure of a predefined profile over one or more of the light emitter, and the light receiver, wherein the predefined profile is configured to enable:
the light emitter to emit light in a predetermined direction towards smoke present within a chamber of the smoke detector;
the light receiver to receive only light being reflected by the smoke and a predefined amount of clean air signal present in the chamber, placing the enclosure having a strip of a predefined width, at least partially over a lens associated with one or more of the light emitter and the light receiver, wherein the strip blocks the direct line of sight between the light emitter and the light receiver.

16. The method of claim 15, wherein the method comprises the step of removing a predetermined area of the enclosure associated with the cap for the light emitter and fitting the cap over the light emitter to enable focusing the emitted light in the predetermined direction toward the smoke present within the chamber.

17. The method of claim 15, wherein the method comprises the step of removing a predetermined area of the enclosure associated with the cap for the light receiver and fitting the cap over the light receiver to allow the light receiver to receive only the light being reflected by the smoke and the predefined amount of the clean air signal present in the chamber.

18. A cap for eliminating a direct line of sight between a light emitter and a light receiver of a smoke detector, the cap comprising:

an enclosure of a predefined profile that is adapted to be removably fitted over one or more of the light emitter and the light receiver;

wherein the cap upon fitting over any of the light emitter and the light receiver, blocks a direct line of sight between the light emitter and the light receiver and allows the light receiver to receive only the light being reflected by smoke and a predefined amount of clean air signal present within the smoke detector, wherein the enclosure comprises a strip of a predefined width that extends at least over a lens associated with one or more of the light emitter and the light receiver upon fitting the cap thereover, wherein the fitted strip blocks the direct line of sight between the light emitter and the light receiver.

* * * * *